UNITED STATES PATENT OFFICE.

CHARLES S. BRADLEY, OF AVON, NEW YORK, AND ROBERT H. READ AND CHARLES B. JACOBS, OF EAST ORANGE, NEW JERSEY, ASSIGNORS TO THE AMPERE ELECTRO-CHEMICAL COMPANY, OF AMPERE, EAST ORANGE, NEW JERSEY, A CORPORATION OF NEW JERSEY.

CARBOPHOSPHID OF CALCIUM.

SPECIFICATION forming part of Letters Patent No. 716,182, dated December 16, 1902.

Application filed April 20, 1898. Serial No. 678,289. (No specimens.)

*To all whom it may concern:*

Be it known that we, CHARLES S. BRADLEY, a resident of Avon, county of Livingston, State of New York, and ROBERT H. READ and CHARLES B. JACOBS, residents of East Orange, county of Essex, State of New Jersey, citizens of the United States, have invented certain new and useful Improvements in Carbophosphid of Calcium, of which the following is a specification.

This invention relates to a new and useful product containing calcium phosphid and a metallic carbid, said product being of a nature to produce when brought into contact with or immersed in water gases which are spontaneously inflammable in air. The product may be used for various purposes, among which may be mentioned its use as a weapon of war—for example, in naval warfare it may be projected or floated to the vicinity of an enemy's vessel or one of her defenses and brought into contact with water either by reason of its immersion or by automatically-regulated devices, when its intense affinity for the oxygen of the water will cause its decomposition, producing, with the hydrogen of the water, gases spontaneously inflammable in air, the flame of which will serve to light up the object of attack or to force a retreat by its intense heat and will also confuse the enemy's fire by the flame and smoke. In military operations it may be employed in projectiles containing water in an envelop which may be ruptured at the proper moment by impact or by a fuse to cause serviceable action. The material is also capable of other uses, which will form the subject of other applications, and need not be specifically referred to herein.

Our new material is a homogeneous mixture of a metallic carbid and a phosphid, such as phosphid of calcium, which are both decomposable by water. The preferable mode of producing it is by fusing together in an electric furnace phosphid of calcium and carbid of calcium in any desirable proportions or by producing a definite compound of carbophosphid of calcium by intimately incorporating raw materials containing phosphorus, carbon, and calcium in suitable proportions to produce a compound answering the general formula $Ca_{(n+m)}C_{2n}P_m$.

The cheapest and most effective way of promoting the combination now known to us consists in mixing together in certain definite proportions normal calcium phosphate, burnt lime or limestone, and carbon and exposing them to the action of an electric furnace. However produced our new product is a homogeneous substance. The union of the carbid and the phosphid is analogous to that in the case where two or more metals unite to form an alloy, the product being of a homogeneous character. With an expenditure of twenty-five to fifty kilowatts a well-defined crystalline product results corresponding to the above general formula. The several ingredients of the mixture should be intimately incorporated, so as to form a homogeneous mass, sufficient carbon being employed to take up all of the oxygen from the lime and phosphate and leave sufficient to combine with the calcium and phosphorus—for example, in a mixture containing two molecular equivalents of burnt lime, one of normal calcium phosphate, and sixteen of carbon the reaction when exposed to the high heat obtainable in an electric furnace may be stated as follows:

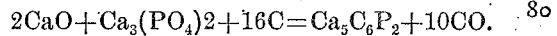
$$2CaO + Ca_3(PO_4)2 + 16C = Ca_5C_6P_2 + 10CO.$$

After the reaction has been completed the compound material is formed in a stable fused mass, which may be allowed to cool or may be tapped from the furnace and admitted to suitable receivers and then allowed to cool. The operation may be made continuous by feeding into the furnace from time to time as the reaction continues fresh charges of the raw material.

The herein-described material, whether constituted according to the definite formula set forth or according to the described mixture of carbid and phosphid, when treated with water decomposes, yielding a gas which contains acetylene, $(C_2H_2,)$ gaseous phosphid of hydrogen, ($PH_3$,) and liquid phosphid of hydrogen ($P_2H_4$) or the vapor of said liquid. The presence of the last-mentioned material renders the whole mixture spontaneously inflammable in air, so that if a mass of the material is thrown upon water or brought into contact with a wet surface gases are instantly generated and burst into flame.

Having thus described our invention, what we claim as new, and desire to secure by Letters Patent, is—

1. A new product consisting in a homogeneous compound of calcium carbid and calcium phosphid in proportions to be spontaneously inflammable on contact with water.

2. The product of the reaction of a fusing temperature upon a mixture of lime, phosphorus, and carbon-containing materials, which product is spontaneously inflammable on contact with water.

3. The product of the reaction of a fusing temperature upon a mixture of calcium phosphate, lime and carbon, which product is spontaneously inflammable on contact with water.

4. The product of the reaction of a fusing temperature upon a mixture of calcium phosphate, lime and carbon, which product is of a crystalline structure and spontaneously inflammable on contact with water.

In testimony whereof we have hereunto subscribed our names this 19th day of April, A. D. 1898.

CHARLES S. BRADLEY.
  ROBERT H. READ.
  CHARLES B. JACOBS.

Witnesses to Bradley and Read:
 JAMES A. VAN WAGENEN,
 ALICK G. MACANDREW.

Witnesses to Jacobs:
 WILLIAM A. HAYES,
 ALICK G. MACANDREW.